United States Patent
Talwar et al.

(10) Patent No.: US 7,763,828 B2
(45) Date of Patent: Jul. 27, 2010

(54) LASER THERMAL PROCESSING WITH LASER DIODE RADIATION

(75) Inventors: Somit Talwar, Los Gatos, CA (US); David A. Markle, Saratoga, CA (US)

(73) Assignee: Ultratech, Inc., San Jose, CA (US)

( * ) Notice: Subject to any disclaimer, the term of this patent is extended or adjusted under 35 U.S.C. 154(b) by 0 days.

(21) Appl. No.: 10/653,625

(22) Filed: Sep. 2, 2003

(65) Prior Publication Data
US 2005/0045604 A1   Mar. 3, 2005

(51) Int. Cl.
B23K 26/00 (2006.01)
B23K 26/02 (2006.01)

(52) U.S. Cl. .......................... 219/121.76; 219/121.78; 219/121.83

(58) Field of Classification Search ............ 219/121.76, 219/121.78, 121.83, 121.82, 121.85, 121.6, 219/121.65, 121.66
See application file for complete search history.

(56) References Cited

U.S. PATENT DOCUMENTS

| 4,214,216 | A | * | 7/1980 | Jones, Jr. ...................... 372/70 |
| 4,356,375 | A |   | 10/1982 | Josephy et al. ........ 219/121 LH |
| 4,520,472 | A | * | 5/1985 | Reno ..................... 369/112.24 |
| 4,734,912 | A | * | 3/1988 | Scerbak et al. ................ 372/27 |
| 4,908,493 | A | * | 3/1990 | Susemihl ............... 219/121.67 |
| 4,959,245 | A | * | 9/1990 | Dobson et al. ................. 117/92 |
| 5,046,070 | A | * | 9/1991 | Negus .......................... 372/33 |
| 5,645,739 | A | * | 7/1997 | Nakata et al. .......... 219/121.64 |
| 5,891,764 | A | * | 4/1999 | Ishihara et al. .............. 438/151 |
| 5,978,074 | A | * | 11/1999 | Opsal et al. .................... 356/72 |
| 6,208,673 | B1 | * | 3/2001 | Miyake ........................ 372/22 |
| 6,362,872 | B1 | * | 3/2002 | Berdanier .................. 356/4.01 |
| 6,366,308 | B1 | * | 4/2002 | Hawryluk et al. ........... 347/256 |
| 6,373,868 | B1 | * | 4/2002 | Zhang ........................... 372/19 |
| 6,531,681 | B1 | * | 3/2003 | Markle et al. ............ 219/121.8 |

(Continued)

OTHER PUBLICATIONS

Naem, Boothroyd, Calder, *CW Laser Annealed Small-Geometry NMOS Transistors*, Mat. Res. Soc. Symp. Proc. vol. 23 (1984) pp. 229-234.

(Continued)

*Primary Examiner*—M. Alexandra Elve
(74) *Attorney, Agent, or Firm*—Allston L. Jones; Peters Verny, LLP

(57) ABSTRACT

A method and apparatus for performing laser thermal processing (LTP) using a two-dimensional array of laser diodes to form a line image, which is scanned across a substrate. The apparatus includes a two-dimensional array of laser diodes, the radiation from which is collimated in one plane using a cylindrical lens array, and imaged onto the substrate as a line image using an anomorphic, telecentric optical imaging system. The apparatus also includes a scanning substrate stage for supporting a substrate to be LTP processed. The laser diode radiation beam is incident on the substrate at angles at or near the Brewster's angle for the given substrate material and the wavelength of the radiation beam, which is linearly P-polarized. The use of a two-dimensional laser diode array allows for a polarized radiation beam of relatively high energy density to be delivered to the substrate, thereby allowing for LTP processing with good uniformity, reasonably short dwell times, and thus reasonably high throughput.

22 Claims, 7 Drawing Sheets

U.S. PATENT DOCUMENTS

| | | | |
|---|---|---|---|
| 6,599,790 B1 * | 7/2003 | Yamazaki et al. | 438/166 |
| 7,056,389 B2 * | 6/2006 | Hauf et al. | 118/724 |
| 7,091,411 B2 * | 8/2006 | Falk et al. | 136/258 |
| 2003/0021307 A1 * | 1/2003 | Yamazaki | 372/24 |

OTHER PUBLICATIONS

Goetzlich, Tsien, Ryssel, *Relaxation Behavior of Metastable AS and P Concentrations in SI After Pulsed and CW Laser Annealing*, Mat. Res. Soc. Symp. Proc. vol. 23 (1984) pp. 235-240.

\* cited by examiner

[ Note: angle measurement $\theta_B$ with respect to normal N ]

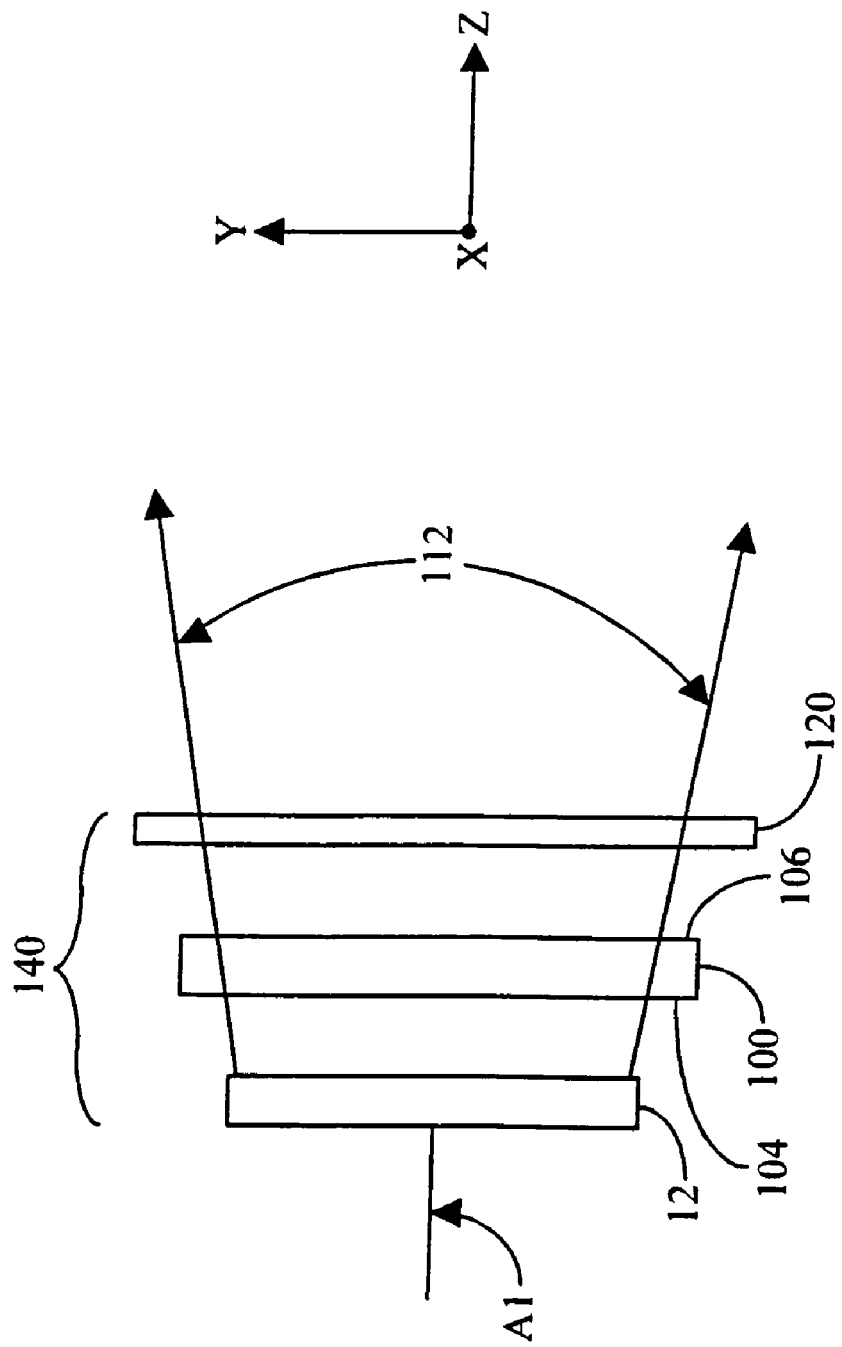

LASER THERMAL PROCESSING WITH LASER DIODE RADIATION

CROSS-REFERENCE TO RELATED APPLICATION

This application is related to U.S. patent application Ser. No. 10/287,864, filed on Nov. 6, 2002, now U.S. Pat No. 6,747,245 issued Jun. 8, 2004 and assigned to Ultratech, Inc.

BACKGROUND OF THE INVENTION

1. Field of the Invention

The present invention relates to laser thermal processing, and in particular relates to apparatus and methods for performing laser thermal processing with laser diode radiation.

2. Description of the Prior Art

Laser thermal processing ("LTP") (also referred to as "laser thermal annealing") is a technique used to anneal and/or activate dopants of source, drain or gate regions of integrated devices or circuits, to form silicide regions in integrated devices or circuits, to lower contact resistances of metal wiring coupled thereto, or to trigger a chemical reaction to either deposit or remove substances from a substrate.

Various devices for performing LTP of a semiconductor substrate have been known and used in the integrated circuit (IC) fabrication industry. LTP is preferably done in a single cycle that brings the temperature of the material being annealed up to the annealing temperature and back down in a single cycle. If a pulsed laser is used, this requires enough energy per pulse to bring the entire chip or circuit up to the annealing temperature. Because the required field size can exceed four (4) centimeters-squared ($cm^2$) and the required dose can exceed one (1.0) Joules/$cm^2$, a relatively large, expensive laser is required. It is also difficult to achieve good dose uniformity over a relatively large area in a single pulse because the narrow spectral range of most lasers produces a speckled pattern due to interference effects.

Laser diode bars are well-suited to serve as a source of radiation for performing LTP because their wavelengths of 780 nm or 810 nm are readily absorbed in the top layer (i.e., ~21 microns) of silicon Diode bars are also efficient converters of electricity to radiation (~45%).

U.S. Pat. No. 6,531,681 (the '681 patent) describes how a linear laser diode array, or several linear diode arrays, can be used to form a uniform, narrow line image that can be scanned across a substrate to thermally anneal integrated circuits thereon. The '681 patent also describes how the line image can be placed on a mask and imaged through a projection system to process selected areas of a substrate scanned in synchronism with the mask. However, performing laser thermal processing with a linear array of laser diode bars as described in the '681 patent is problematic. Applications involving silicon substrates have system requirements (i.e., image width and dwell time) that require relatively high energy densities (e.g. In the range of 1300 W/$mm^2$ for a 200 µs dwell time).

U.S. Pat. No. 6,747,245 describes the use of a P-polarized $CO_2$ laser beam incident at near Brewster's angle to perform LTP of a silicon substrate with integrated circuits formed thereon. As described therein, the use of incident angles at or near Brewster's angle produces very uniform heating of substrates that are spectrally non-uniform at normal incidence. For example, at normal incidence bare silicon has a reflectivity greater than 30% and silicon oxide has a reflectivity of less than 4%. One benefit of using a $CO_2$ laser when performing LTP is its ability to deliver a well-collimated beam having relatively high energy density. Another benefit is that the 10.6 µm wavelength emitted by the $CO_2$ laser is large compared to the various film thicknesses likely to be found on a wafer ready for the annealing step. Small variations in film thickness therefore do not result in large variations in reflectivity as would be the case for a shorter annealing wavelength.

However, the $CO_2$ laser wavelength of 10.6 µm is best suited for annealing heavily doped silicon substrates, which can absorb sufficient radiation in the top 50 to 100 µm of material. However, for annealing lightly doped substrates or substrates that are doped only in a shallow layer near the top surface, the $CO_2$ laser radiation passes right through with very little of the incident energy resulting in useful heating.

Laser diodes, on the other hand, emit radiation at wavelengths of 780 nm or 810 nm. These wavelengths are readily absorbed in the top 10 to 20 µm of a silicon wafer. Thus, with laser diodes operating at the short time scales (i.e., 100 µs to 20 ms) associated with LTP, the heating depth is determined by thermal diffusion rather than by a long absorption depth (length).

It would therefore be useful to have systems and methods for performing laser thermal annealing at or near the Brewster's angle with polarized laser diode radiation delivered at relatively high energy densities.

SUMMARY OF THE INVENTION

A first aspect of the invention is a system for performing laser thermal processing (LTP) of a substrate using laser diode radiation. The system includes a two-dimensional array of laser diodes adapted to emit radiation over a narrow range of wavelengths, such as 780 nm to 800 nm. The radiation emitted by the two-dimensional array of laser diodes is formed into a line image at the substrate, and strikes the substrate at an incident angle that is at or near the Brewster's angle for the substrate. Because the radiation beam is polarized in the P-direction, almost all of the incident energy is coupled into the substrate and very little is reflected. Variations in the reflectivity caused by the various film stacks present on the wafer are also minimized at or near the Brewster's angle for silicon.

A second aspect of the invention is a method of performing laser thermal processing (LTP) of a substrate using laser diode radiation. The method includes emitting radiation of a select wavelength from a two-dimensional array of laser diodes, receiving the emitted radiation with an LTP optical system, and irradiating the substrate with a radiation beam that forms a line image at the substrate. The radiation beam is incident on the substrate at an incident angle at or near the Brewster's angle for the substrate. The method also includes scanning the line image over at least a portion of the substrate so that each scanned portion of the substrate sees a pulse of laser radiation. This pulse takes the surface temperature of the silicon substrate to within 400° C. or less of the melting point of silicon (1410° C.) for a period between 100 µs and 20 ms.

BRIEF DESCRIPTION OF THE DRAWINGS

FIG. 3B is a close-up exploded view of the optical elements closest to the laser diode array as viewed in the Y-Z plane;

Figure 1:
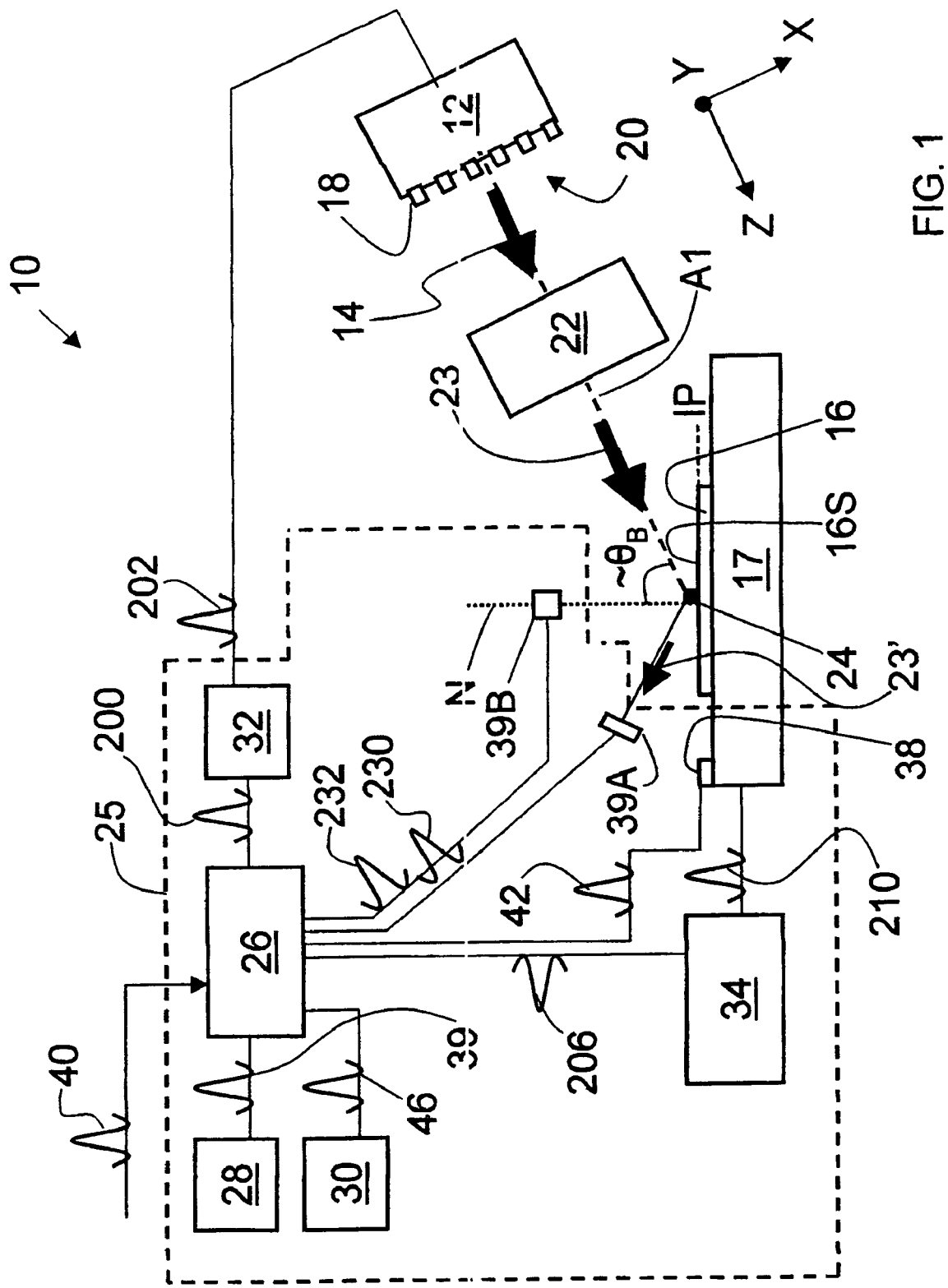
FIG. 1 is schematic diagram of the LTP apparatus of the present invention.

The various elements depicted in the drawings are merely representational and are not necessarily drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

The apparatus of the present invention is first described, followed by its methods of operation. The power density requirements and system throughput capabilities are then set forth.

Apparatus

FIG. 1 is a schematic diagram of an example embodiment of the LTP apparatus 10 in accordance with the present invention. The apparatus 10 includes a two-dimensional laser diode array 12 that generates relatively intense radiation 14 used for treating (i.e., irradiating) a substrate 16 supported by a movable stage 17. The substrate surface 16S resides at or near an image plane IP of an LTP optical system 22. These elements as well as others making up apparatus 10 are discussed separately below.

Laser Diode Array 12

Laser diode array 12 includes a plurality of laser diodes 18 positioned at regularly spaced intervals along a two-dimensional emission face 20 of the array. In an example embodiment, laser diode array 12 is formed by combining (e.g., "stacking") linear diode arrays that make up rows or columns of the array.

A typical commercially available laser diode array bar (i.e., linear diode array) is a stack of one (1) centimeter linear arrays each containing 60 emitters and spaced about 160 μm apart along the length of the array. Each emitter is about 1 μm wide and about 150 μm long. The orientation of the emitter is such that the largest dimension of the emitter is aligned with the length of the array. The laser diodes 18 typically emit radiation 14 that diverges 10° in a plane defined herein as the Y-Z plane and containing the axis of the individual linear arrays. Further, radiation beam 14 diverges by an amount (e.g., 30°) in a plane orthogonal to the axis of the individual linear diode arrays (defined herein as the XZ plane).

Suitable laser diode array bars are commercially-available from numerous suppliers, including SDL, 80 Rose Orchard Way, San Jose, Calif. 95134-1365 (e.g., the SDL 3400 series includes linear arrays 1 cm long and capable of 40 Watts (W) output power), Star Technologies, Inc. of Pleasanton, Calif., Spire, Inc. of One Patriots Park, Bedford, Mass. 01730-2396, Siemens Microelectronics, Inc., Optoelectronics Division, of Cupertino, Calif. (Model SPL BG81), Spectra Diode Labs, Thompson CFS of 7 Rue du Bois Chaland, CE2901 Lisses, 91029 Evry Cedex, France, and IMC, 20 Point West Boulevard, St. Charles, Mo. 63301.

Because the heat generated in the operation of the laser diodes 18 can be substantial and limits the maximum available output power, the laser diode array bars are typically water-cooled to prevent overheating during use.

In a specific example embodiment, laser diode array 12 is made up of 25 rows of laser diodes 18, with each row separated by 1.9 mm and containing 49 laser diodes each measuring 100 μm along the X-axis and 1 μm along the Y-axis (i.e., along the cross-row direction). Each laser diode row is 10 mm long and the laser diode array 12 is 24×1.9 mm=45.6 mm wide. The radiation emitted from each laser diode in the Y-Z plane diverges 10° full-width half-max (FWHM) and by 35° FWHM in the X-Z plane. A suitable two-dimensional laser diode array 12 is available from Coherent, Inc, under the line of LightStone™ products (e.g., the diode array sold under the tradename LIGHTSTACK).

In example embodiments, laser diode array 12 generates radiation 14 at a wavelength in the range from about 350 nanometers (nm) to 950 nm, and in a particular example embodiment at 780 nm or at 810 nm. Such wavelengths are particularly effective for processing a silicon substrate having integrated devices or circuit features on the order of one micron or less with source/drain regions of a few tens of nanometers (nm) in thickness.

It is noted here that the present invention is not limited to a laser diode array 12 generating radiation only within the above-stated wavelength range. Commercially available laser diodes emit radiation at wavelengths extending from 380 nm (e.g., GaN blue diodes) through 931 nm. The wavelengths and types of laser diode arrays commercially-available on the market have rapidly expanded, and this trend will likely continue so that numerous additional arrays both in and out of the above-stated wavelength range are expected to become available from manufacturers in the future. Arrays of such future laser diodes may be useful for implementation in the subject invention, particularly those that emit wavelengths absorbed by silicon. Some commercially-available laser diode array bars are capable of generating radiation 14 at a relatively intense power level of 50 W to 100 W in a 1 cm long bar containing a single row of diodes.

In an example embodiment, laser diode array 12 generates radiation having a power density of 150 W/mm$^2$ or greater as measured at the substrate.

LTP Optical System 22

With continuing reference to FIG. 1, apparatus 10 also includes LTP optical system 22 arranged to receive radiation 14 from laser diode array 12 and create a radiation beam 23 that forms a substantially uniform-intensity line image 24 at image plane IP. In the present invention, "line image" means a two-dimensional image having a high aspect ratio (e.g., about 7:1) so that the image is relatively long in one dimension and relatively narrow ("thin") in the other. Optical system 22 has an optical axis A1 (dashed line).

Radiation beam 23 is incident on substrate 16 at an angle at or near the Brewster's angle $\theta_B$ (in the FIG. 1 "~$\theta_B$" denotes "at or near Brewster's angle"). The incident angle is defined as the angle between the surface normal N (i.e., the normal vector to substrate surface 16S, as indicated by a dotted line) and the axial ray of radiation beam 23 (the axial ray, not shown, is collinear with optical axis A1). Brewster's angle is defined by the material making up the substrate and the wavelength of the incident radiation. In the present invention, substrate 16 is preferably silicon, such as the type used in IC manufacturing. The Brewster's angle for room temperature of silicon is ~75° at a wavelength of 800 nm and is ~74° at a wavelength of 10.6 μm. Although Brewster's angle is not defined for a film stack, the presence of films on silicon changes the angle of minimum reflectivity slightly. Nevertheless, in most applications involving films formed on a silicon substrate, the Brewster's angle for the bare silicon wafer is a good approximation.

In an example embodiment of the present invention, the incident angle of radiation beam 23 is within ±10° of the Brewster's angle for the material of the substrate being processed (e.g., silicon). In another example embodiment, the incident angle is between 60° and 80°.

The use of incidence angles near Brewster's angle produces uniform heating on substrates that are spectrally non-uniform at normal incidence because of the presence of different films having different spectral characteristics. For example, a given wafer can have one region that is predominately bare crystalline silicon, and another region that is predominately covered with isolation trenches filled with $SiO_2$ to a depth of 0.5 µm. A third region may have areas containing a 0.1 µm film of poly-silicon on top of an oxide trench in silicon. The reflectivity of each of these regions varies with the angle of incidence as measured relative to surface normal N (FIG. 1). By operating at or near Brewster's angle (e.g., generally between 60° and 80°) it is possible to nearly equalize the absorption in the different regions of the substrate and over a wide variety of films and film thicknesses.

Another advantage of operating in this angular range is that the reflectivities of all the films are very low in this region and therefore incident radiation beam 23 is coupled into substrate 16 very efficiently. At normal incidence, about 33% of the incident radiation beam is reflected from bare silicon, and about 3.4% is reflected from the surface of an infinitely thick $SiO_2$ layer. At an incidence angle of 68°, only about 3% of the radiation is reflected from the bare silicon and from the top surface of the $SiO_2$ layer. When interference effects from multiple surfaces are considered the result is more complicated, but the total variation in reflectivity from the various possible films is minimized when the P-polarized incident radiation beam 23 is incident at or near the Brewster's angle for silicon.

Figure 2A:
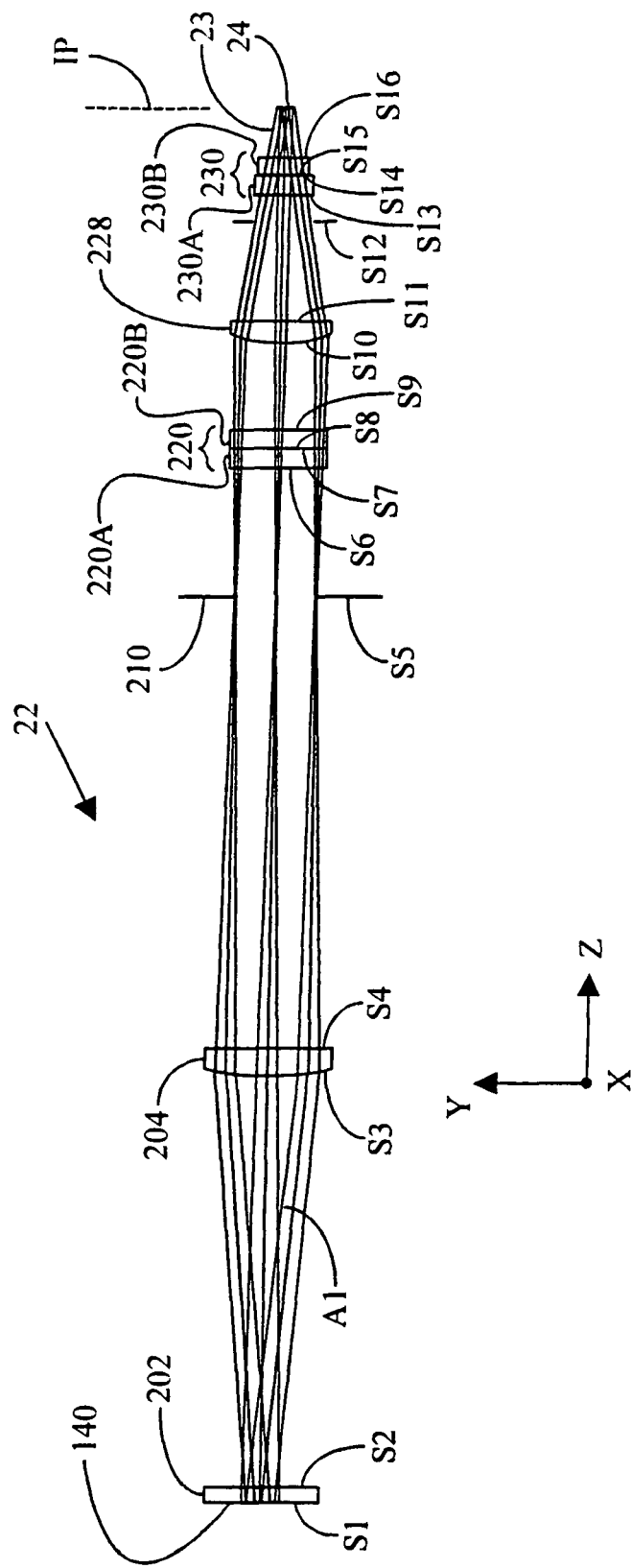
FIG. 2A is a schematic diagram of the LTP optical system of the present invention as viewed in the Y-Z plane.
Figure 2B:
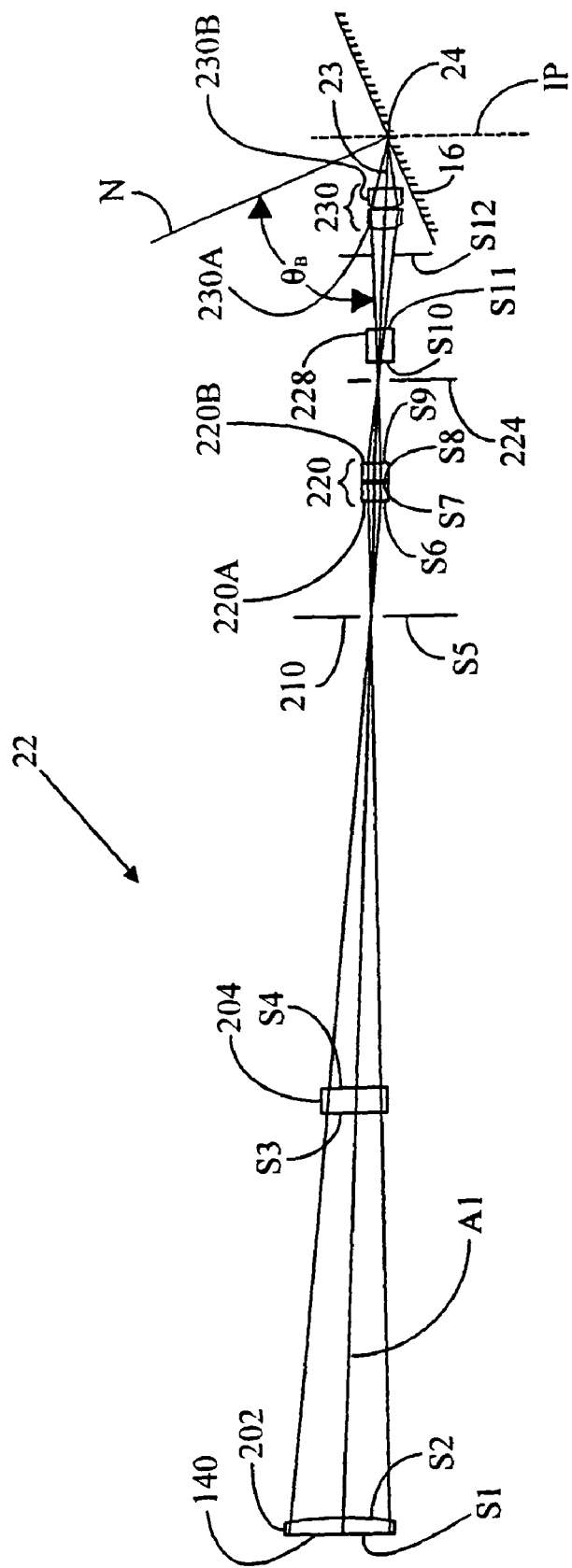
FIG. 2B is a schematic diagram of the LTP optical system of the present invention as viewed in the X-Z plane.
Figure 3A:
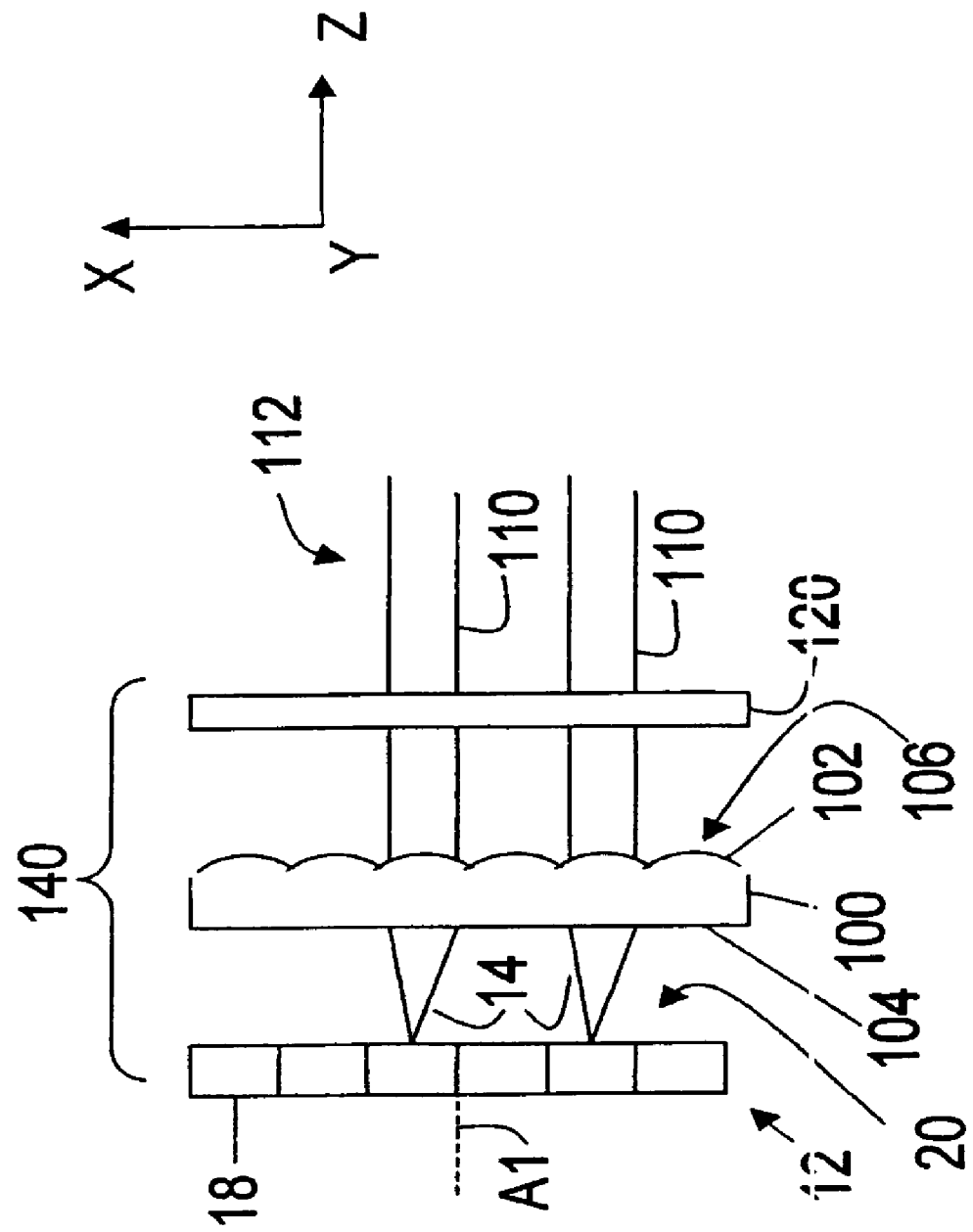
FIG. 3A is a close-up exploded view of the optical elements closest to the laser diode array as viewed in the X-Z plane.

FIGS. 2A and 2B are schematic diagrams of the anamorphic LTP optical system 22 as viewed in the Y-Z and X-Z planes, respectively. As mentioned above, radiation emitted by a laser diode diverges by different amounts in different planes, e.g., by 10° FWHM in the Y-Z plane and by 35° in the X-Z plane. FIGS. 3A and 3B are close-up, exploded, side views of the optical elements closest to laser diode array 12 as viewed in the X-Z and Y-Z planes, respectively.

With reference first to FIGS. 3A and 3B, to collimate the radiation from laser diode array 12 in the X-Z plane, system 22 includes along optical axis A1 a two-dimensional cylindrical lens array 100 arranged immediately adjacent laser diode array 12. Cylindrical lens array 100 is made up of cylindrical lens elements 102 and has an input side 104 and an output side 106. The number of cylindrical lens elements 102 in array 100 corresponds to the number of rows of laser diodes 18 in laser diode array 12. The spacing between adjacent lens elements 102 is preferably the same as that between adjacent rows of laser diodes (e.g., 1.9 mm in the above-described example embodiment) and the lens elements have lens power in the X-Z plane. Thus, N cylindrical lenses produce N collimated and parallel beams 110 in the X-Z plane. Note that these beams still diverge (e.g., by 10°) in the Y-Z plane, which contains the rows of laser diodes.

In an example embodiment, the focal length of each cylindrical lens element is relatively short, e.g., about 3 mm. The N collimated beams 110 (e.g., N=25) are equivalent to a single collimated output beam 112 of a given width (e.g., 47.5 mm). Theoretically the angular spread of the rays in the (substantially) collimated beam 112 could be very small (e.g., 0.024°) and limited only by the 1 µm size of the emitter or by diffraction. In practice, the diode rows wind up slightly bent resulting in a misalignment with the cylindrical lens elements 102. This limits the minimum divergence angle of output beam 112 (e.g., to about 0.3° FWHM).

An example of a suitable cylindrical lens array 100 is available from Limo Micro-Optics & Laser Systems, Bookenburgweg 4, 44319 Dortmund, Germany. The polarization direction of beams 110 is oriented such that the electric field vector is perpendicular to the row direction, i.e., the polarization is in the X-direction. In this case, and with the optical arrangement shown in FIG. 2B, it is not necessary to change the polarization direction. However, other diode arrays can be polarized in the orthogonal direction and these would require changing the polarization direction to correspond to a P-polarization at image plane IP. Similarly, if the desired angle between the diode beam and the substrate were obtained in the Y-Z plane, it would be necessary to change the polarization direction.

Thus, with continuing reference to FIGS. 3A and 3B, in an example embodiment, LTP optical system 22 includes an optional half-wave plate 120 arranged immediately adjacent cylindrical lens array 110 to rotate the polarization of the radiation by 90° should a change in polarization direction be required. The half-wave plate 120 can also be used to vary the intensity of P-polarized radiation beam 23 on the substrate by rotating the plate about the optical system axis A1. Since all diode bars emit linearly polarized radiation, the angular orientation of half-wave plate 120 determines the relative amounts of P-polarized and S-polarized radiation incident on the substrate. Since the P-polarized component of radiation beam 23 is strongly absorbed and the S-polarization component mainly reflected, the orientation of the half-wave plate determines the total energy absorbed in the substrate. Thus, the orientation of the half-wave plate can be used to control the total amount of energy delivered to and absorbed in the substrate.

For the sake of description and ease of illustration, laser diode array 12, cylindrical lens array 100 and optional half-wave plate 120 are grouped together and considered herein to constitute an effective laser radiation source 140 that emits output beam 112.

With reference again to FIGS. 2A and 2B, which are orthogonal views of the same LTP relay, LTP optical system 22 further includes, in order along optical axis A1, a cylindrical field lens 202 arranged immediately adjacent effective radiation source 140. Cylindrical field lens 202 has power in the X-Z plane. LTP optical system 22 further includes a cylindrical collimating lens 204 with power in the Y-Z plane, an elliptical pupil 210, a first cylindrical relay group 220 with power in the X-Z plane, and an intermediate image plane 224. System 22 also includes a cylindrical focusing lens 228 with power in the Y-Z plane, and a second cylindrical relay lens group 230 with power in the X-Z plane. In an example embodiment, cylindrical relay lens groups 220 and 230 are air-spaced doublets made up of lenses 220A, 220B and 230A, 230B, respectively.

In this example, cylindrical collimating lens 204 and cylindrical focusing lens 228 form a telecentric, anamorphic relay with a reduction power (ratio) of about 2 but which generally can vary between about 1.5 and about 4.5 in the Y-Z plane. Note that a reduction power of about 2 corresponds to a magnification magnitude of about ½. These cylindrical lenses contribute no power in the X-Z plane (FIG. 2B). Thus the telecentric image produced by the relay shown in FIG. 2A is 5 mm long and subtends a 20° cone angle.

Normally, it would be desirable to have as large a reduction ratio as possible to concentrate the power in line image 24 formed at substrate 16. However the larger the reduction ratio, the larger the cone angle at the substrate and the larger the angular variation in the range of incidence angles in radiation beam 23 as seen by the substrate. For example, if laser diode array 12 was imaged 1:1 onto substrate 16, then the angular spread of the radiation leaving the laser diode array would be duplicated in the radiation beam at the substrate.

To keep the optical design relatively simple, and to limit the variation of incidence angles at substrate 16, it is desirable to limit the angular spread of radiation beam 23 at the substrate to about 20°, which corresponds to the aforementioned demagnification ratio of about 2 in the Y-Z plane. Thus, by way of example, a 10 mm long row of diodes is imaged into a line image 5 mm long.

With reference to FIG. 2B, cylindrical field lens 202 (in cooperation with cylindrical lens array 100 and optional half-wave plate 120) act to form a pupil 210 at a location chosen so that the line final image 24 is telecentric. First cylindrical relay lens group 220 forms an intermediate image of laser diode array 12 at intermediate image plane 224 with a demagnification factor of about 8.3. Second cylindrical relay lens group 230 demagnifies the second intermediate image by another factor of about 8.8 for a total demagnification of about 69 to yield an image size of about 0.66 mm normal to the optical axis A1. Since the image is incident on the substrate at an angle of 66°, the image size on the substrate is increased by 1/cos θ, where θ is the incidence angle. Thus the width of image 24 on the substrate is about 1.62 mm.

In the above example, the magnifications in the X-Z and Y-Z planes were determined by setting an upper limit of 20° to the cone angle in radiation beam 23 as seen by the substrate. However, there is no fundamental limit for the range of incidence angles, although a small range of angles can yield less variation in the energy absorbed across the wafer. If the beam collimation produced by the diode and cylindrical lens arrays had been tighter, then a higher magnification in the X-Z plane could have been used to obtain a narrower line image. Similarly, there is no fundamental reason why the numerical aperture of the laser beam on the substrate has to be identical in both planes. Thus, the reduction power in the Y-Z plane could have been, say between about 1.5× and about 4.5×, and the reduction power in the X-Z plane could have been, say between about 50× and about 150×. The reduction power in the X-Z direction depends on the angular spread in the radiation beams 112 after collimation by cylindrical lens array 100.

Figure 4A:
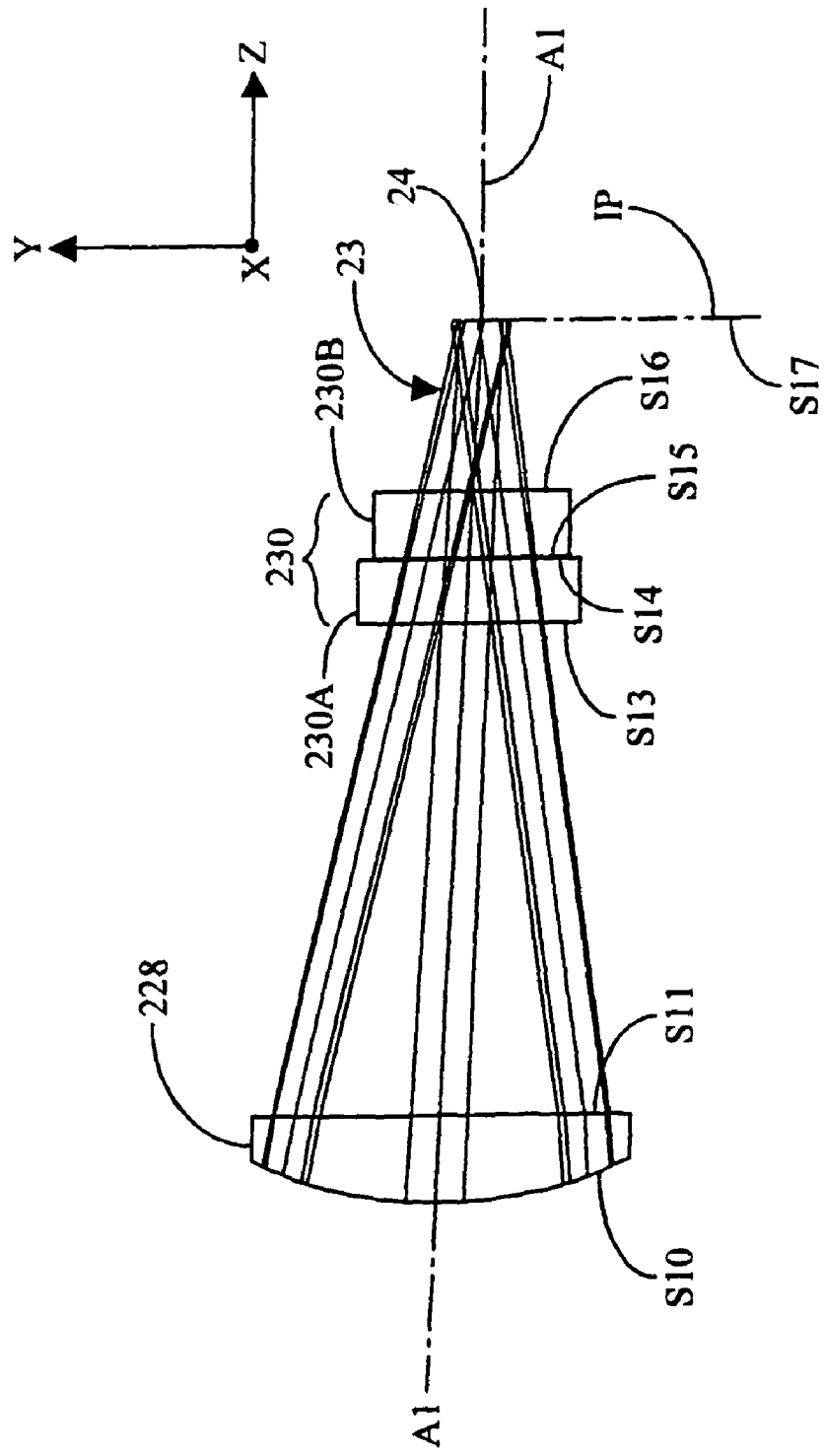
FIG. 4A is a close-up view of the elements of the LTP optical system closest to the substrate as viewed in the Y-Z plane.
Figure 4B:
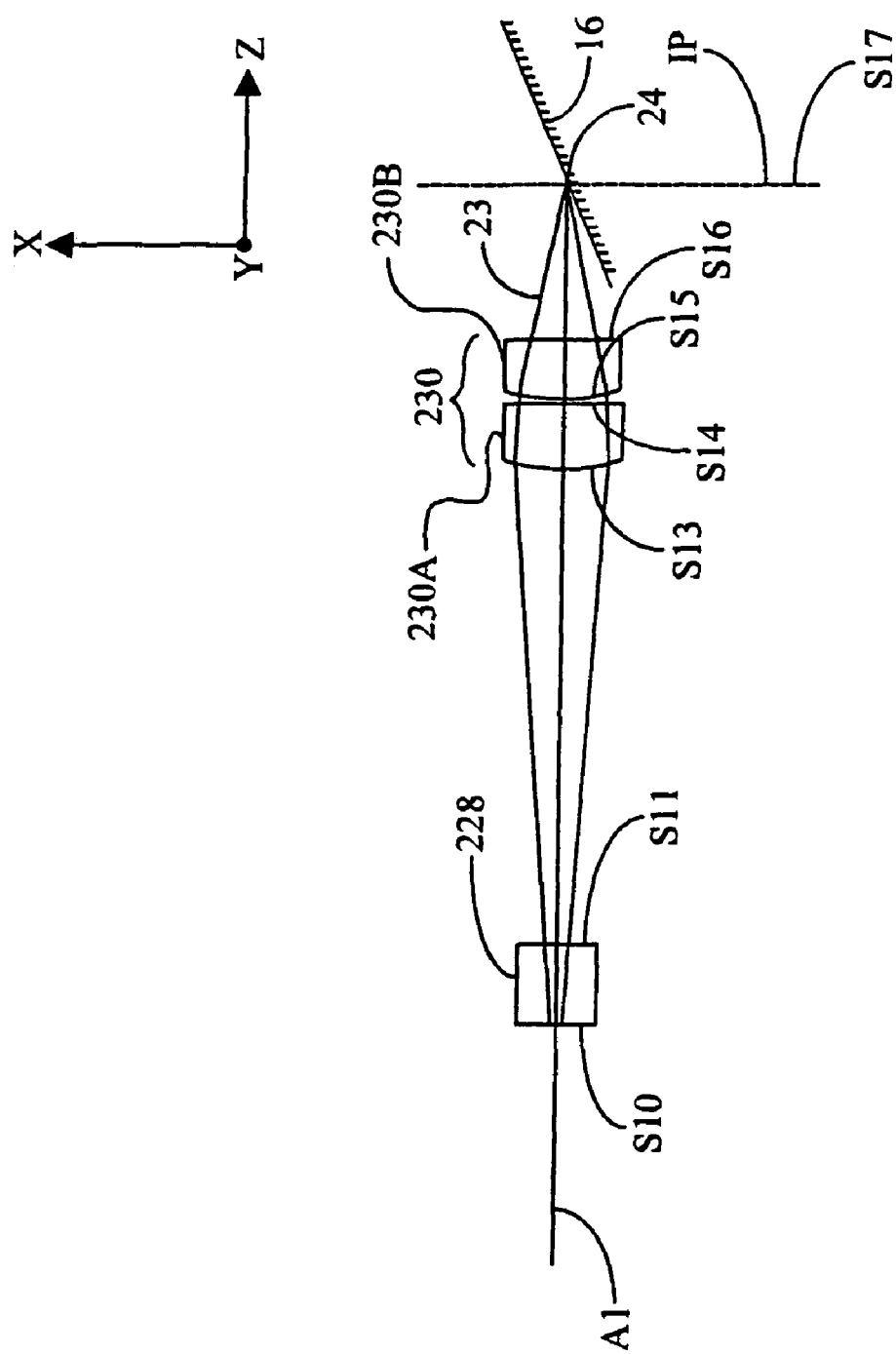
FIG. 4B is a close-up view of the elements of the LTP optical system closest to the substrate as viewed in the X-Z plane.

A close-up view of cylindrical focusing lens 228 and cylindrical relay lens group 230 forming line image 24 at substrate 16 as viewed in the Y-Z plane and the X-Z plane is shown in FIGS. 4A and 4B, respectively.

The optical design data for an example embodiment of LTP optical system 22 as described above is set forth in Table 1, below. In the Table, the first column is the surface number, the second column is the surface radius, the third column is the distance to the next surface (thickness or spacing) and the fourth column identifies the lens material. The letter "S" stands for "surface number" S1, S2, etc., and TH stands for "thickness." All the thickness and radius values are in millimeters (mm). An asterisk (*) indicates an aspheric surface for surfaces S3 and S10, and the aspheric surface data is provided separately below the main body of Table 1.

Image Power Density

In an example embodiment, each row of diodes is capable of generating about 80 W of optical power with water cooling. Assuming an overall efficiency of 70%, the image power density (i.e., the intensity in image 24) is about:

Power=25(80 W)(0.7)/(1.62 mm)(5 mm)=173 W/mm$^2$

This amount of power is significantly less than the 1300 W/mm$^2$ (associated with a 200 μs dwell time) needed in the prior art LTP system of the '681 patent.

In an example embodiment, the intensity (power density) in line image 24 is 100 W/mm$^2$ or greater.

Control System

With reference again to FIG. 1, in an example embodiment, LTP apparatus 10 further includes a control system 25 (dashed box) that controls the operation of the apparatus. Control system 25 includes a controller 26, an input unit 28 coupled to controller 26, and a display unit 30 coupled to controller 26. In addition, control system 25 includes a power supply 32 coupled to controller 26 that powers laser diode array 12, a stage controller 34 coupled to stage 17 and to controller 26 that controls the movement of stage 17, and a detector 38 coupled to controller 26 and residing on the stage. Detector 38 is arranged to detect at least a portion of radiation beam 23 delivered to image plane IP when the stage is moved to place the detector in the path of radiation 23 (i.e., to intercept line image 24 at or near image plane IP).

In an example embodiment, control system 25 includes a reflected radiation monitor 39A and a temperature monitor 39B. Reflected radiation monitor 39A is arranged to receive radiation 23 reflected from line image 24 on substrate surface 16S. Reflected radiation is denoted by 23'. Reflected radiation 23' is from the opposite side of line image 24 from radiation 23 and, as is well known in the art, that reflection will have the same angle of incidence from substrate surface 16S as radiation 23. Temperature monitor 39B is arranged to measure the temperature of substrate surface 16S, and in an example embodiment is shown arranged along the surface normal N so as to view the substrate at normal incidence at or near where line image 24 is formed. However temperature monitor 39B could also be arranged to view the substrate at the Brewsters' angle corresponding to the wavelength band used to measure temperature. Monitors 39A and 39B are coupled to controller 26 to provide for feedback control based on measurements of the amount of reflected radiation 23' and/or the measured temperature of substrate surface 16S, as described in greater detail below In an example embodiment, controller 26 is a microprocessor coupled to a memory, or a microcontroller, programmable logic array (PLA), field-programmable logic array (FPLA), programmed array logic (PAL) or other control device (not shown). The controller 26 can operate in two modes of operation: open-loop, wherein it maintains a constant power on the substrate and a constant scan rate; and closed-loop, wherein it maintains a constant maximum temperature on the substrate surface or a constant power absorbed in the substrate. Since the maximum temperature varies directly as the applied power and inversely as the square root of the scan velocity, in an example embodiment a closed loop control is used to maintain a constant ratio of incident power divided by the square root of the scan velocity (i.e., if $P_{23}$ is the amount of power in radiation beam 23 and V is the scan velocity, then the ratio $P_{23}/V^{1/2}$ is kept constant).

For closed loop operation, controller 26 receives at least one parameter via a signal (e.g., an electrical signal), such as the maximum substrate temperature (e.g., via signal 232 from temperature monitor 39B), the power $P_{23}$ in radiation beam 23 (e.g., via signal 42 from detector 38), the reflected power in reflected radiation beam 23'0 (e.g., via signal 230 from reflected radiation monitor 39A. Further, controller 26 is adapted to calculate parameters based on the received signals, such as the amount of power absorbed by wafer 16 as determined, for example, from the information in signals 230, 232 and/or 42.

The controller 26 is also coupled to receive an external signal 40 from an operator or from a master controller that is part of a larger substrate assembly or processing tool. This parameter is indicative of the predetermined dose of radiation to be supplied to process the substrate or the maximum temperature to be achieved by the substrate. The parameter signal(s) can also be indicative of the intensity, scan velocity, scan speed, and/or number of scans to be used to deliver a predetermined dose of radiation to substrate 16.

Based on the parameter signal(s) received by controller 26, the controller can generate a display signal 46 and send it to display unit 30 to visually display information on the display unit so that a user can determine and verify the parameter signal level(s). The controller 26 is also coupled to receive a start signal that initiates processing performed by the apparatus 10. Such start signal can be signal 39 generated by input unit 28 or external signal 40 from an external unit (not shown), such as a master controller.

Method of Operation

The method of operation of LTP apparatus 10 is now described. With continuing reference to FIG. 1, in response to a start signal (e.g., signal 39 or signal 40) that initiates the system's operational mode, controller 26 is preprogrammed to cause substrate stage 17 (via stage controller 34) to position the substrate in a suitable starting location, to initiate scanning (e.g., moving substrate stage 17), and then to generate a radiation beam 23 of appropriate intensity. A laser diode beam intensity control signal 200 based on the parameter signals as preset by the user or external controller is provided to power supply 32. Power supply 32 then generates a regulated current signal 202 based on the intensity control signal. More specifically, the amount of current in current signal 202 from the power supply is determined by intensity control signal 200. The power supply current is outputted to laser diode array 12 to generate a select level of radiation power 14.

In an example embodiment, controller 26 is preprogrammed to generate a scan control signal 206 based on the parameter signals indicative of the predetermined scan speed and number of scans. The controller 26 generates the scan control signal 206 in coordination with intensity control signal 200 and supplies the scan control signal to stage controller 34. Based on scan control signal 206 and a predetermined scan pattern preprogrammed into the stage controller, the stage controller generates a scan signal 210 to effect movement (e.g., raster, serpentine or boustrophedonic) of stage 36 so that line image 24 is scanned over the substrate 16 or select regions thereof.

In an example embodiment, detector 38 generates a detector signal 42 indicative of the amount of power in radiation beam 23 received at substrate 16, which is a function of the power level of radiation 14 from laser diode array 12 and the transmission of LTP optical system 22. In an example embodiment, controller 26 (or a user directly) determines the intensity control signal 200 and the scan speed. The maximum temperature produced on substrate 16 is approximately proportional to the radiation intensity $I_{23}$ (i.e., $P_{23}$/(unit area)) divided by the square root of the scan speed, i.e., $I_{23}/V^{1/2}$. Hence, in an example embodiment, controller 26 is preprogrammed to achieve a desired maximum temperature by varying either the scan rate, or the laser intensity, or both, to obtain a value of intensity divided by root scan velocity corresponding to the desired maximum temperature. In a further example embodiment, the desired maximum temperature is maintained constant during scanning.

In another example embodiment, an amount of reflected radiation 23' is measured by reflected radiation monitor 39A, and provides a signal 230 corresponding to the measured power to controller 26. The proportion of radiation beam 23 absorbed by the substrate and the corresponding power level is then calculated using the incident radiation measurement (e.g., from detector 38) and the reflected radiation measurement. Signal 230 is then used by controller 26 to control the radiation power level 23 provided by laser diode array 12 to substrate 16 to ensure that the correct maximum temperature is maintained in the substrate.

In another example embodiment, substrate temperature monitor 39B measures the temperature of substrate surface 16S and provides a signal 232 to controller 26 that corresponds to the maximum substrate surface temperature. Signal 232 is then used i by controller 26 to control the amount of radiation 23 provided by laser diode array 23 to the substrate to ensure that the correct maximum temperature is maintained in the substrate during scanning.

The method also includes scanning line image 24 over at least a portion of the substrate so that each scanned portion sees a pulse of laser diode radiation that takes the surface temperature of the silicon substrate 16 to just under (i.e. to within 400° C. or less) the melting point of silicon (1410° C.) for a period of between 100 µs and 20 ms.

Power Density Requirements for Silicon LTP

The absorbed power density required for annealing silicon substrates (wafers) varies with the "dwell time," which is the amount of time line image 24 resides over a particular point on substrate surface 16S (FIG. 1). In general, the required power density varies inversely with the square root of the dwell time, as illustrated in Table 2.

Assuming that a minimum power of 170 W/mm² is required to perform LTP for silicon-based applications, a laser diode array 12 capable of producing such minimum power can perform LTP with dwell times on the order of 10 ms.

System Throughput

It is important to the commercial viability of an LTP system that it be able to process a sufficient number of substrates per unit time, or in the language of the industry, have a sufficient "throughput." To estimate the throughput for LTP apparatus 10, consider a 300 mm silicon wafer and a line image 5 mm long and 1.62 mm wide. The number of scans over the wafer is given by 300 mm/5 mm=60. Further, for a dwell time of 10 ms, the scan speed is 162 mm/s. The time for one scan is given by (300 mm)/(162 mm/s)=1.85 s. For a stage acceleration rate of 1 g, the acceleration/deceleration time of the stage is (162 mm/s)/(9800 mm/s²)=0.017 s. Thus, the time to process one substrate is 60(1.85 s+(2)(0.017 s)=113 s. If the time to input and output a substrate to and from the apparatus is 15 seconds total, then the throughput is given by (3600 s/hr)/(15 s+113 s)=28 substrates/hour, which is a commercially viable throughput value.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

TABLE 1

Lens design data for example embodiment of LPT optical system 22 as illustrated in FIGS. 2A and 2B

| S | Radius (RDY, RDX) | TH | Glass | Element |
|---|---|---|---|---|
| 1 | RDY = 8 RDX = 8 | 6.000 | Silica | Lens 202 |
| 2 | RDY = 8 RDX = −208.824 | 196.238 | | |
| 3* | RDY = 92.224 RDX = 8 | 10.000 | Silica | Lens 204 |
| 4 | RDY = 8 RDX = 8 | 232.209 | | |
| 5 | RDY = 8 RDX = 8 | 47.500 | | Pupil 210 |
| 6 | RDY = 8 RDX = 20.204 | 8.000 | Silica | Lens 220A |
| 7 | RDY = 8 RDX = 8 | 0.500 | | |
| 8 | RDY = 8 RDX = 20.668 | 8.000 | Silica | Lens 220B |
| 9 | RDY = 8 RDX = 8 | 43.100 | | |
| 10* | RDY = 46.026 RDX = 8 | 10.000 | Silica | Lens 228 |
| 11 | RDY = 8 RDX = 8 | 40.943 | | |
| 12 | RDY = 8 RDX = 8 | 21.500 | Pupil | |
| 13 | RDY = 8 RDX = 24.143 | 8.000 | Silica | Lens 230A |
| 14 | RDY = 8 RDX = 8 | 0.500 | | |
| 15 | RDY = 8 RDX = 15.783 | 8.000 | Silica | Lens 230B |
| 16 | RDY = 8 RDX = 8 | 21.510 | | |
| 17 | RDY = 8 RDX = 8 | 0.000 | | Image plane |

Surface S3
k = −3.410989,
Surface S10
k = −1.011858,

Wherein k is a toroidal aspheric constant defined by the equation:

$$z = cy^2/(1+(1-(1+k)c^2y^2)^{0.5})$$

where: z is the position of a point on the surface of the toroid normal to its axis and in the direction of the optical axis y is the position of a point on the toroid normal to its axis and normal to the optical axis c is the surface curvature or the reciprocal of the surface radius

TABLE 2

Dwell time vs. Power Density

| Dwell Time | Power Density |
|---|---|
| 200 μs | 1200 W/mm$^2$ |
| 500 μs | 759 W/mm$^2$ |
| 1 ms | 537 W/mm$^2$ |
| 2 ms | 379 W/mm$^2$ |
| 5 ms | 240 W/mm$^2$ |
| 10 ms | 170 W/mm$^2$ |

What is claimed is:

1. A system for performing laser thermal annealing of a semiconductor substrate having one or more activatable region and a Brewster's angle for a select wavelength of radiation, comprising:
   a two-dimensional array of laser diodes collectively adapted to emit continuous P-polarized radiation at the select wavelength; and
   an optical system arranged to receive the radiation emitted by the two-dimensional array of laser diodes and form a radiation beam that results in a line image at the substrate, wherein the radiation beam is incident the substrate at an incident angle that is at or near the Brewster's angle;
   a movable stage to support, and position, the substrate for at least one of said one or more activatable region to receive said line image;
   a reflected radiation monitor arranged to receive radiation reflected from the line image on the substrate and generate a reflected radiation signal corresponding to the amount of reflected radiation received;
   a temperature monitor arranged to measure a surface temperature of the substrate at the line image and generate a temperature signal corresponding to the measured surface temperature; and
   a controller connected to the movable stage, the reflected radiation monitor, the temperature monitor and the two-dimensional array of laser diodes, wherein the controller is adapted to control the emission of radiation from the two-dimensional array of laser diodes in response to receiving at least one of the reflected radiation signal and the temperature signal, and control the movable stage to scan the line image over the at least one of the one or more activatable region of the substrate with an intensity and duration effective to anneal the at least one of the one or more activatable region without exceeding the melting point of the semiconductor substrate;
   wherein the line image has an intensity and duration effective to anneal the at least one of the one or more activatable region without exceeding the melting point of the semiconductor substrate.

2. The system of claim 1, further including a movable stage controller to activate the stage to move the substrate relative to the line image to scan the line image over the at least one of the one or more activatable region of the substrate.

3. The system of claim 1, wherein the two-dimensional array of laser diodes collectively emits radiation having an intensity as measured at the substrate of 150 W/mm$^2$ or greater.

4. The system of claim 1, wherein the two-dimensional array of laser diodes emits radiation having a wavelength selected from the group of wavelengths comprising: 780 nm and 810 nm.

5. The system of claim 1, wherein the radiation emitted by the two-dimensional array of laser diodes is collimated by a linear array of cylindrical lenses resulting in a radiation beam that is collimated in a first plane and divergent at about 10° in a second plane orthogonal to the first plane.

6. The system of claim 5, further including a half-wave plate arranged in the path of the radiation to ensure that P-polarized radiation is incident on the substrate.

7. The system of claim 1, wherein the optical system is an anamorphic relay having a magnification between about 1.5 and about 4.5 in one plane and a magnification of between about 50 and about 150 in the orthogonal plane.

8. The system of claim 1:
   further comprising a radiation detector coupled to said controller to measure the power of said radiation beam incident the substrate; and
   said controller disposed to calculate the radiation power absorbed by the substrate from the measured power from said radiation detector and the reflected radiation signal from said reflected radiation monitor.

9. The system of claim 1, wherein the two-dimensional array of laser diodes includes a number of laser diodes arranged in an X-Y plane, and wherein the optical system includes:
   an optical axis coincident with a Z-direction, wherein X, Y, and Z are mutually orthogonal axes thereby defining Y-Z and X-Z planes within the optical system;

a cylindrical lens array arranged immediately adjacent the array of laser diodes and having a number of cylindrical lens elements with power in the X-Z plane, wherein the number of cylindrical lens elements corresponds to the number of rows of laser diodes, and the radiation from each row of diodes is collimated in the X-Z plane after passing through the cylindrical lens elements;

a telecentric, anamorphic relay arranged to receive laser radiation exiting the cylindrical lens array and comprising a group of cylindrical lenses with power in the Y-Z plane; and a second group of cylindrical lenses with power in the X-Z plane.

10. The system of claim 9, wherein:

the telecentric anamorphic relay has a reduction magnification factor in the range from about 1.5 to about 4.5 in one plane; and the telecentric anamorphic relay has reduction magnification factor in the range from about 50 to about 150 in the orthogonal plane.

11. A method of performing laser thermal annealing of a semiconductor substrate having one or more activatable region and a Brewster's angle for a select wavelength of radiation and substrate material, comprising:

emitting continuous radiation of the select wavelength collectively from a two-dimensional array of laser diodes;

receiving the emitted radiation with an optical system and forming from the emitted radiation a linearly P-polarized radiation beam that forms a line image at the substrate;

irradiating at least one of the one or more activatable region of the substrate with the line image of the radiation beam at an incident angle at or near the Brewster's angle;

scanning the line image over the at least one of the one or more activatable region of the substrate with an intensity and duration effective to anneal the at least one of the one or more activatable region without exceeding the melting point of the semiconductor substrate;

measuring radiation power reflected from the line image on the substrate;

measuring a maximum substrate temperature produced by the radiation beam; and controlling the emission of radiation from the two-dimensional array of laser diodes in response to at least one of the reflected radiation power and the substrate temperature.

12. The method of claim 11, wherein the line image has an intensity of 100 W/mm$^2$ or greater.

13. The method of claim 11, wherein the substrate material is silicon, and wherein the incident angle is within ±10° of the Brewster's angle for silicon.

14. The method of claim 11, wherein the scanning has an associated scanning velocity, the method further including:

providing the radiation beam with a select amount of radiation power; and maintaining the amount radiation power incident on the substrate as constant and the substrate scan velocity as constant values during said scanning.

15. The method of claim 11, further including:

measuring the radiation power incident on the substrate; and calculating the radiation power absorbed in the substrate using the measured incident radiation power and measured reflected radiation power.

16. The method of claim 15, including controlling the radiation power absorbed by the substrate by controlling the incident radiation power in order to maintain the absorbed radiation power level constant during scanning.

17. The method of claim 11, wherein scanning is performed at a scan velocity, and wherein the method includes:

measuring the radiation power absorbed by the substrate; and controlling the substrate scanning velocity using the measured amount of absorbed radiation power to maintain a constant value of the amount of absorbed radiation power divided by the square root of the scan velocity.

18. The method of claim 11, wherein the scanning is performed at a scan velocity, the method including:

arranging a half-wave plate in the radiation beam; and adjusting the half wave plate to vary the P-polarization of the radiation beam in order to maintain a constant value of an amount of radiation absorbed by the substrate divided by the square root of the scan velocity.

19. The method of claim 11, including:

controlling the radiation beam power level to maintain a constant maximum substrate temperature.

20. The method of claim 19, wherein said controlling includes varying the intensity of the incident radiation beam.

21. The method of claim 11, wherein the scanning is performed at a scanning velocity, and wherein the method includes:

controlling the scanning velocity to maintain a constant maximum substrate temperature.

22. The method of claim 19, wherein said varying the intensity of the radiation beam includes adjusting the orientation of a half-wave plate arranged in the radiation beam.

* * * * *